US007964842B2

(12) United States Patent
Köster et al.

(10) Patent No.: US 7,964,842 B2
(45) Date of Patent: Jun. 21, 2011

(54) EVALUATION OF FREQUENCY MASS SPECTRA

(75) Inventors: Claus Köster, Lilienthal (DE); Karsten Michelmann, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 216 days.

(21) Appl. No.: 12/474,953

(22) Filed: May 29, 2009

(65) Prior Publication Data

US 2009/0294651 A1 Dec. 3, 2009

(30) Foreign Application Priority Data

May 30, 2008 (DE) ......................... 10 2008 025 974

(51) Int. Cl.
*B01J 59/44* (2006.01)

(52) U.S. Cl. ......................... 250/282; 250/291; 250/292

(58) Field of Classification Search ................... 250/282
See application file for complete search history.

(56) References Cited

U.S. PATENT DOCUMENTS 4,959,543 A * 9/1990 McIver et al. ................. 250/291
5,264,697 A * 11/1993 Nakagawa et al. ........... 250/291
5,283,436 A 2/1994 Wang
5,436,447 A * 7/1995 Shew ............................ 250/291
5,572,125 A * 11/1996 Dunkel ......................... 324/307
5,625,186 A 4/1997 Frankevich et al.
5,696,376 A * 12/1997 Doroshenko et al. ......... 250/292
6,403,955 B1 6/2002 Senko
2002/0130259 A1 9/2002 Anderson et al.
2007/0084995 A1 4/2007 Newton et al.
2007/0203652 A1 8/2007 Horning et al.
2008/0149821 A1 * 6/2008 Senko ........................... 250/282
2009/0084949 A1 4/2009 Franzen et al.

* cited by examiner

*Primary Examiner* — Phillip A Johnston
(74) *Attorney, Agent, or Firm* — O'Shea Getz P.C.

(57) ABSTRACT

The invention relates to the evaluation of mass spectra from mass spectrometers in which ions are excited to mass-specific oscillating or orbiting motions, and the ion motion is recorded as a time signal. The invention provides methods to detect parameter drift that occurs during the recording of a time signal in such a "frequency mass spectrometer" by analyzing the instantaneous frequency or the phase spectrum of a frequency component, and provides a method to correct for influence of the frequency drift on the mass spectrum correspondingly. In one embodiment a Fourier transformation converts a measured time signal into a frequency spectrum and examines the phase spectrum of a frequency component to establish whether this phase spectrum deviates from the phase spectrum of a harmonic time signal. The phase spectrum of a harmonic time signal is either linear or constant. In another embodiment the time domain signal is processed using a Short Time Fourier Transformation function to determine an instantaneous frequency, which can be used to correct the parameter drift, yielding a corrected time signal. From the corrected time signal a mass spectrum with better mass resolution can be derived, as can be seen from corrected mass signal profile compared with uncorrected mass signal profile.

8 Claims, 4 Drawing Sheets

EVALUATION OF FREQUENCY MASS SPECTRA

PRIORITY INFORMATION

This patent application claims priority from German patent application 10 2008 025 974.8 filed May 30, 2008, which is hereby incorporated by reference in its entirety.

FIELD OF THE INVENTION

The present invention relates to the evaluation of mass spectra from mass spectrometers in which ions are excited to mass-specific oscillating or orbiting motions, and the ion motion is detected as a time signal.

BACKGROUND OF THE INVENTION

In general, it is understood that a Fourier transform mass spectrometer ("FT-MS") is an ion cyclotron resonance mass spectrometer ("ICR-MS") where ion packets are excited to mass-specific cyclotron motions in a strong magnetic field, and the excited ions generate image currents in detection electrodes. The image currents are recorded as time signals ("transients") and converted into a frequency spectrum by a Fourier transformation. The frequency spectrum may be converted into a mass spectrum since the cyclotron frequency is inversely proportional to the mass of an ion. The ions are trapped, radially by a magnetic field and axially by electric potentials, in an ion cyclotron resonance ("ICR") measuring cell.

The magnetic field of an ICR mass spectrometer is typically generated by superconducting solenoids at liquid helium temperatures, and reaches field strengths of up to 15 tesla. As a result, ICR mass spectrometers have the best mass resolution and mass accuracy of all mass spectrometers since the magnetic field of a superconducting solenoid is stable, and frequency measurement is one of the most accurate prior art measurement methods. The cyclotron frequency may be shifted by space charge in the ICR measuring cell, which is generated by the ions. Simulations show that ion packets orbiting on cyclotron trajectories influence one another and, therefore, change shape in the course of the measurement as a result of interactions within individual ion packets and between different ion packets. The space charge, and thus the cyclotron frequencies of the ion packets, may be subject to a temporal drift during the measuring time. The electric potentials for axial trapping of the ions in the measuring cell also influence the cyclotron frequency and must be constant, at least during the measuring time. All types of parameter drifts during the measuring time lead to temporal frequency modulations in the ion current signal. This temporal frequency modulation causes the line widths in the frequency spectrum to increase (i.e., "smearing" the line), reducing the mass resolution. As a result, the smeared line may cause inaccurate mass determinations.

There are other classes of mass spectrometers where ion packets are stored in one spatial direction in a harmonic parabolic potential, and in the direction perpendicular to the harmonic parabolic potential by radial forces. The radial forces may be, for example, magnetic fields, pseudopotentials generated by RF fields, or electrostatic fields between central electrodes and outer shell electrodes. These types of mass spectrometers detect an oscillatory motion in the harmonic potential, in contrast to ICR mass spectrometers which detect the cyclotron motion. If the harmonic potential is spatially homogenous at right angles to the oscillatory motion, an ion packet containing ions of the same mass will keep its shape. Ions of different masses oscillate as coherent ion packets at different frequencies and induce image currents in detection electrodes. The image currents are detected with high time resolution. In ICR mass spectrometers, the recorded time signal is converted into a frequency spectrum using a Fourier transformation and changed into a frequency mass spectrum by a corresponding conversion of the frequency axis.

These classes of "oscillation mass spectrometers" includes the following embodiments:

- three-dimensional RF quadrupole ion traps with detection electrodes for image currents as disclosed in U.S. Pat. No. 5,625,186 to Frankevich et al. and U.S. Pat. No. 5,283,436 to Wang;
- linear RF quadrupole ion traps with detection electrodes for image currents, where the ions oscillate between two pole rods, and the detection electrodes are located between the pole rods, as disclosed in U.S. Pat. No. 6,403,955 to Senko),
- an electrostatic ion trap, marketed by Thermo-Fischer Scientific (Bremen) under the name of "Orbitrap® electrostatic ion trap", where the ions orbit in a radial electric field, on the one hand, and oscillate in a parabolic electric potential in a direction perpendicular to this, on the other hand. The necessary electric potentials are generated by an internal spindle-shaped electrode, which is held at an attractive potential, and an outer shell, to which a repulsive potential is applied.

The ICR mass spectrometers and the oscillation mass spectrometers hereinafter will be referred to jointly as "frequency mass spectrometers" since, in both types, the motion of ion packets detected is temporally resolved (e.g., by image currents) and the recorded time signal is transformed into a frequency spectrum. The time signal is a superposition of different frequency components (i.e., time signals with different frequencies which are separated in the frequency spectrum) when ions of different masses are present.

The mass resolution of a frequency mass spectrometer increases—at least in theory—in proportion to the measuring time. In the Orbitrap® spectrometers and other commercially available ICR mass spectrometers, the measuring time for a time signal is typically between one tenth (1/10) of a second and a few seconds. These measuring times produce a high mass resolution in the order of $R=m/\Delta m=100{,}000$ for a given mass $m=200$ Dalton, where "m" is the mass and "$\Delta m$" is the full width at half-maximum ("FWHM") of a mass signal. Typically, the mass resolution decreases with increasing ion mass for all frequency mass spectrometers, although in different proportions.

Frequency mass spectrometers generally require a strong enough vacuum such that the ion packets do not spread out by diffusion during the measuring time as a result of undergoing a large number of collisions. Furthermore, the instrument parameters of frequency mass spectrometers, such as the electric potentials at the electrodes or currents generating magnetic fields, and also internal parameters, such as the space charge or electrostatic charges on electrodes, must be as constant as possible during the measuring time to avoid frequency shifts. Any temporal parameter drift may cause broadening and shifting of the peaks in the frequency spectrum, which limits the mass resolution or the mass accuracy of the mass spectrum. One consequence of the relatively long measuring times is that it is difficult to keep all instrument parameters sufficiently constant. Furthermore, it may only be possible to influence internal parameters to a limited extent, if at all (e.g., for a space charge which changes over time as a result of interactions within ion packets or between ion packets).

SUMMARY OF THE INVENTION

According to one aspect of the invention, a method for detecting a parameter drift within a time signal of a frequency mass spectrometer includes determining an instantaneous frequency as a function of time of at least one frequency component of the time signal, and analyzing the drift of the instantaneous frequency by time.

According to another aspect of the invention, a method for detecting a parameter drift within a time signal of a frequency mass spectrometer includes transforming the time signal into a frequency spectrum, and analyzing the phase spectrum of at least one frequency component to determine whether the phase spectrum of the frequency component differs from the phase spectrum of a harmonic time signal.

According to yet another aspect of the invention, a method for determining and correcting a frequency mass spectrum includes recording a time signal with a frequency mass spectrometer, determining the instantaneous frequency of a frequency component as a function of time, transforming the time axis of the time signal such that the frequency component of the transformed time signal has an instantaneous frequency with a relatively constant profile in time, and converting the transformed time signal into a frequency mass spectrum.

In general, detecting a temporal parameter drift includes an analysis of a frequency component of the time signal in the time domain, or of the phase of a frequency component in the frequency domain, to determine whether the instantaneous frequency is constant during the recording of the time signal, or whether the phase spectrum of the frequency component deviates from the phase spectrum of a harmonic time signal.

When ions of different mass are investigated in a frequency mass spectrometer, the detected time signal is a superposition of different frequency components. The time signal (i.e., the time domain), is transitioned to a frequency spectrum (i.e., the frequency domain), where the different frequency components are spectrally separated. The frequency spectrum is usually described by an amplitude spectrum and a phase spectrum. The instantaneous frequency of a frequency component as a function of time is a temporal derivative of the phase profile of the frequency component in the time domain, i.e., a function of time which shows how the carrier frequency of the frequency component changes with respect to time. In addition to the equivalent representations in the time and frequency domains, a time domain signal may also be described by time-frequency distributions, which have both a time axis and a frequency axis and are a two-dimensional representation of the time signal. Some known examples of time-frequency distributions include the Short Time Fourier Transform distributions (STFT) and the time-frequency distributions of Cohen's class, which may, for example, include the Page Distribution.

The detection of a temporal parameter drift is important for initial startup and the operation of a frequency mass spectrometer since it provides controlled variables which may be used to optimize parameters of the instrument. The instantaneous frequency as a function of time may be particularly suitable here because it describes the temporal profile of the parameter drift, whereby parameters may be identified which are relevant for optimization.

The mathematical correction of a detected parameter drift may include: in a first step, the instantaneous frequency of a frequency component is determined and, in a second step, the time axis of the time signal is transformed such that the frequency component of the transformed time signal has an instantaneous frequency constant over time. The instantaneous frequency may be used to derive a transformation function with which the time axis is locally expanded or compressed as required. The transformed time signal is converted into a frequency spectrum by a frequency analysis (e.g., by a Fourier transformation). The frequency spectrum is transformed into a corrected frequency mass spectrum by converting the frequency axis into a mass axis. A mathematical correction may be limited to sections of the frequency mass spectrum where the parameter drift has differing effects on the frequency components present in the time signal. In this case, the correction procedure may be applied to different frequency components. In each case, the section of a frequency component in the frequency mass spectrum is corrected.

The transformation of the time axis may be achieved such that the constant instantaneous frequency after correction corresponds to the uncorrected instantaneous frequency at the start of the measuring time. This compensates for the effect of a space charge that changes over time, and achieves better reproducibility of the mass determination for a sequence of measurements, especially where successive measurements involve different numbers of ions.

These and other objects, features and advantages of the present invention will become more apparent in light of the following detailed description of preferred embodiments thereof, as illustrated in the accompanying drawings.

BRIEF DESCRIPTION OF THE DRAWINGS

In the drawings that follow, unless stated to the contrary, identical reference characters identify similar steps or elements with similar meaning.

DETAILED DESCRIPTION

Figure 1A:
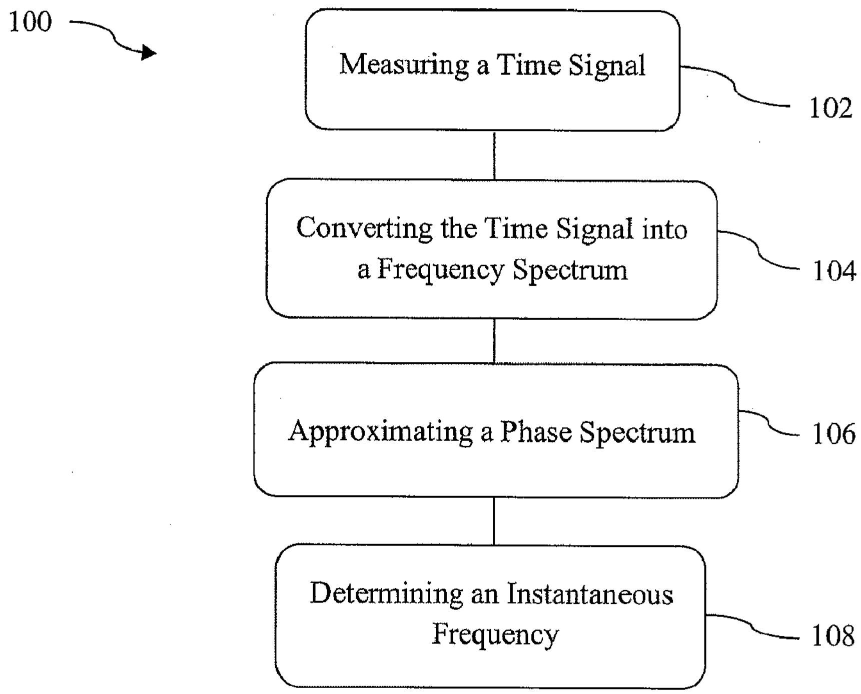
FIGS. 1A and 1B are flow chart illustrations of alternate embodiments of a method for detecting a temporal parameter drift in a frequency mass spectrometer.
Figure 1B:
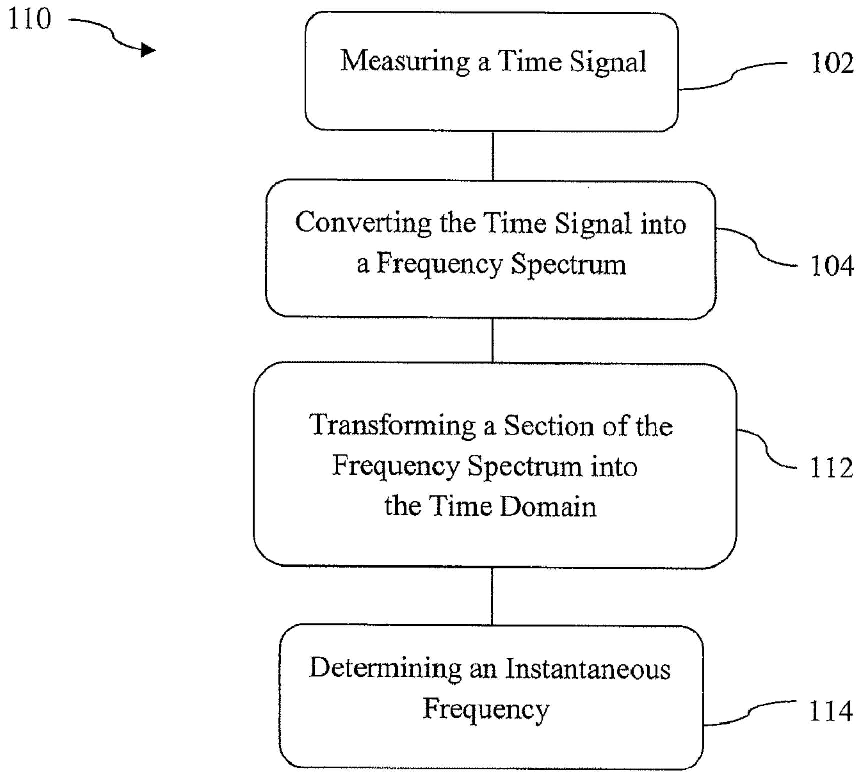

FIGS. 1A and 1B are flow chart illustrations of methods 100, 110 respectively, for detecting a temporal parameter drift in a frequency mass spectrometer. Each of these methods uses a Fourier transformation to convert a measured time domain signal into a frequency spectrum and examines the phase spectrum of a frequency component to establish whether this phase spectrum deviates from the phase spectrum of a harmonic time signal. The phase spectrum of a harmonic time signal may be either linear or constant.

Figure 2:
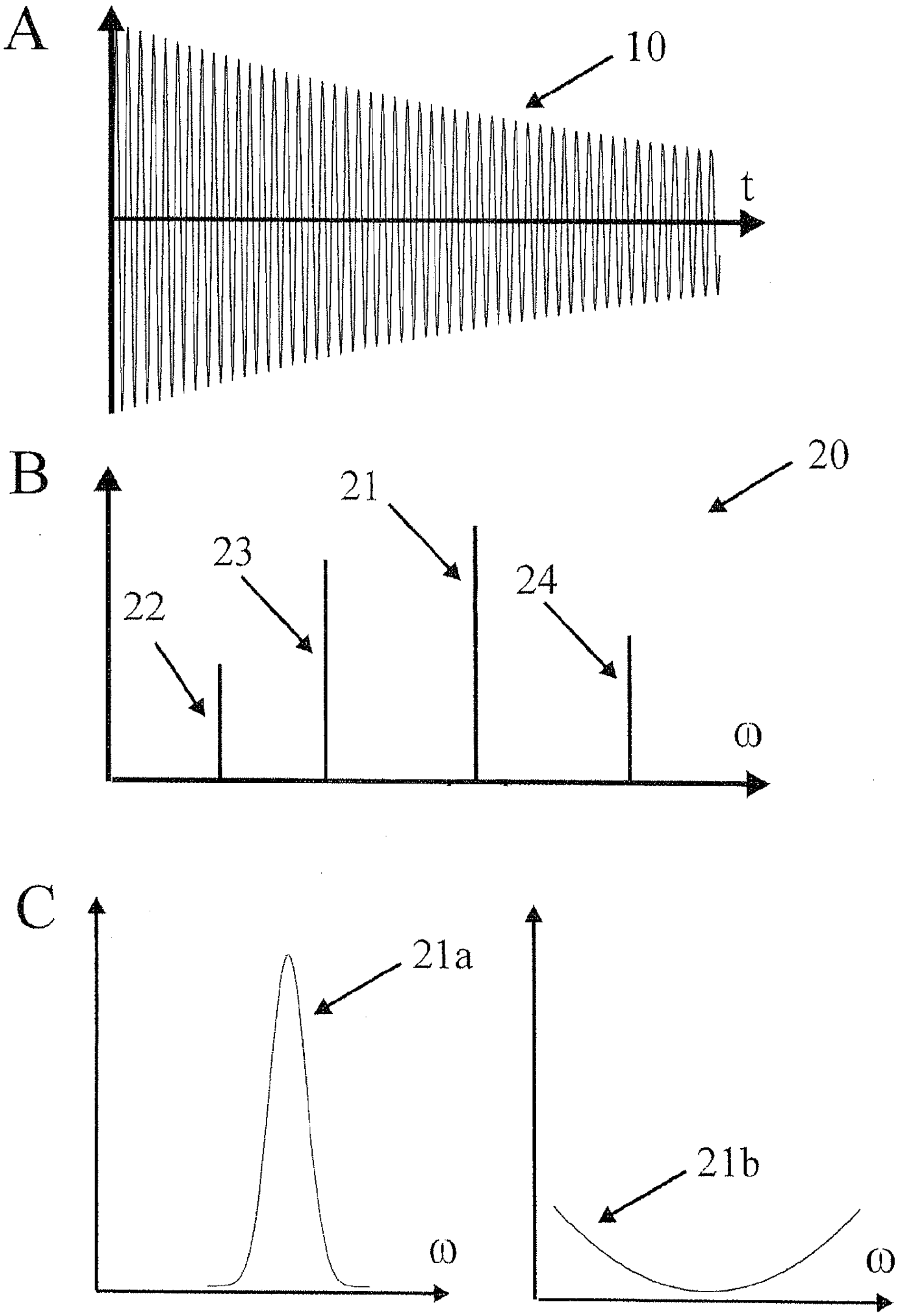
FIGS. 2A to 2C graphically illustrate the method in FIG. 1.

Referring to FIG. 1A, in step 102 a frequency mass spectrometer measures the motion of ions and provides a time domain signal indicative thereof. FIG. 2A illustrates the measured time domain signal as function of time. Referring again to FIG. 1A, in step 104 the measured time signal is converted into the frequency domain using for example a Fourier transformation. The step 104 preferably includes multiplying the measured time domain signal by a bell-shaped window function. The resultant frequency domain signal may have a spectrum 20 as illustrated in FIG. 2B. Sharp edges in the peaks of single frequency components in the amplitude spectrum (e.g., peak 21 in FIG. 2B), and thus a high signal dynamic range in the complete amplitude spectrum 20, are caused by multiplying the time signal 10 by the window function. The amplitude spectrum 20 illustrated in FIG. 2B includes a plurality of frequency components 21, 22, 23, 24. FIG. 1C illustrates an amplitude spectrum section 21*a* of the frequency component 21 and a corresponding phase spectrum 21*b* of the same frequency component 21. Similar to the window function, the amplitude spectrum 21*a* is bell-shaped. The phase spectrum 21*b* has a quadratic profile about the maximum of the amplitude spectrum section 21*a*, indicating a frequency shift during the measurement time.

Substantially every frequency component included in the time domain signal 10 has a constant instantaneous frequency and the phase spectrum 21*b* is represented by a linear function, at least when a Gaussian window function is used. From the familiar tables and calculation rules of the Fourier transformation, it may be inferred that a quadratic profile of the phase spectrum 21*b* is caused by a linear frequency modulation.

Referring again to FIG. 1A, in step 106 the phase spectrum is approximated (e.g., by a second degree polynomial), and in step 108 the instantaneous frequency may be quantitatively determined from the quadratic term of the polynomial.

An alternate method for determining the instantaneous frequency of a frequency component may be used where the phase spectrum has higher terms, where the phase spectrum cannot be approximated by a polynomial, or where a different window function is used. Referring now to FIG. 1B, this alternate method includes step 112 that transforms a section of the frequency spectrum around the frequency component from the frequency domain to the time domain. The time signal obtained using the inverse transformation corresponds to an isolated frequency component in the time domain. In step 114, the instantaneous frequency is determined from the temporal phase profile of the time signal of the isolated frequency component.

Figure 3:
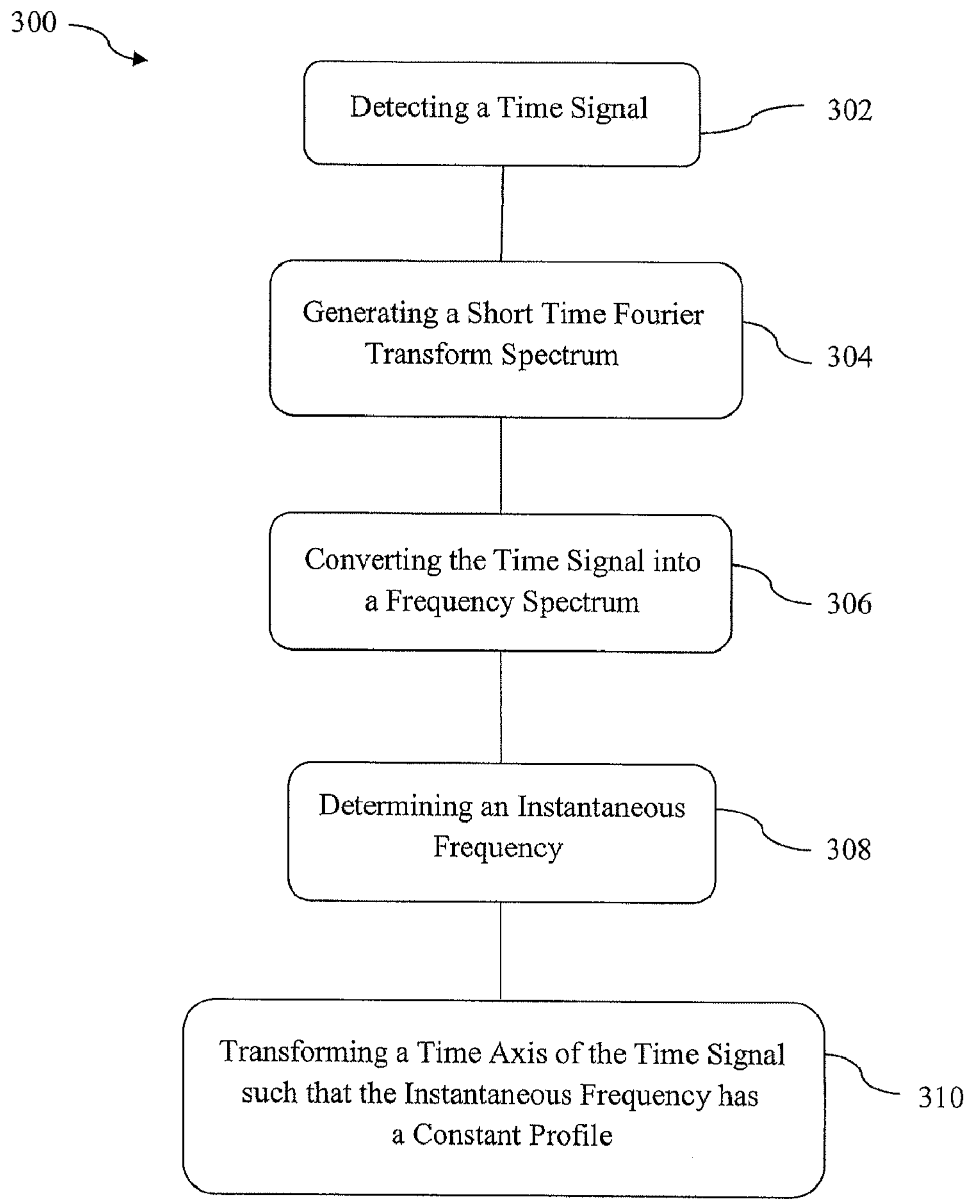
FIG. 3 is a flow chart illustration of yet another embodiment of a method for detecting and correcting a temporal parameter drift in a frequency mass spectrometer.

FIG. 3 is a flow chart of yet another embodiment 300 of a method for detecting and correcting a temporal parameter drift in a frequency mass spectrometer. The time domain signal is detected/read. The signal is converted into a Short Time Fourier Transformation function to determine an instantaneous frequency which may be used to correct the parameter drift, yielding a corrected time signal from which a mass spectrum with better mass resolution may be derived, as may be seen from corrected mass signal profile compared with uncorrected mass signal profile. FIGS. 4A to 4D graphically illustrate the method in FIG. 3.

Figure 4:
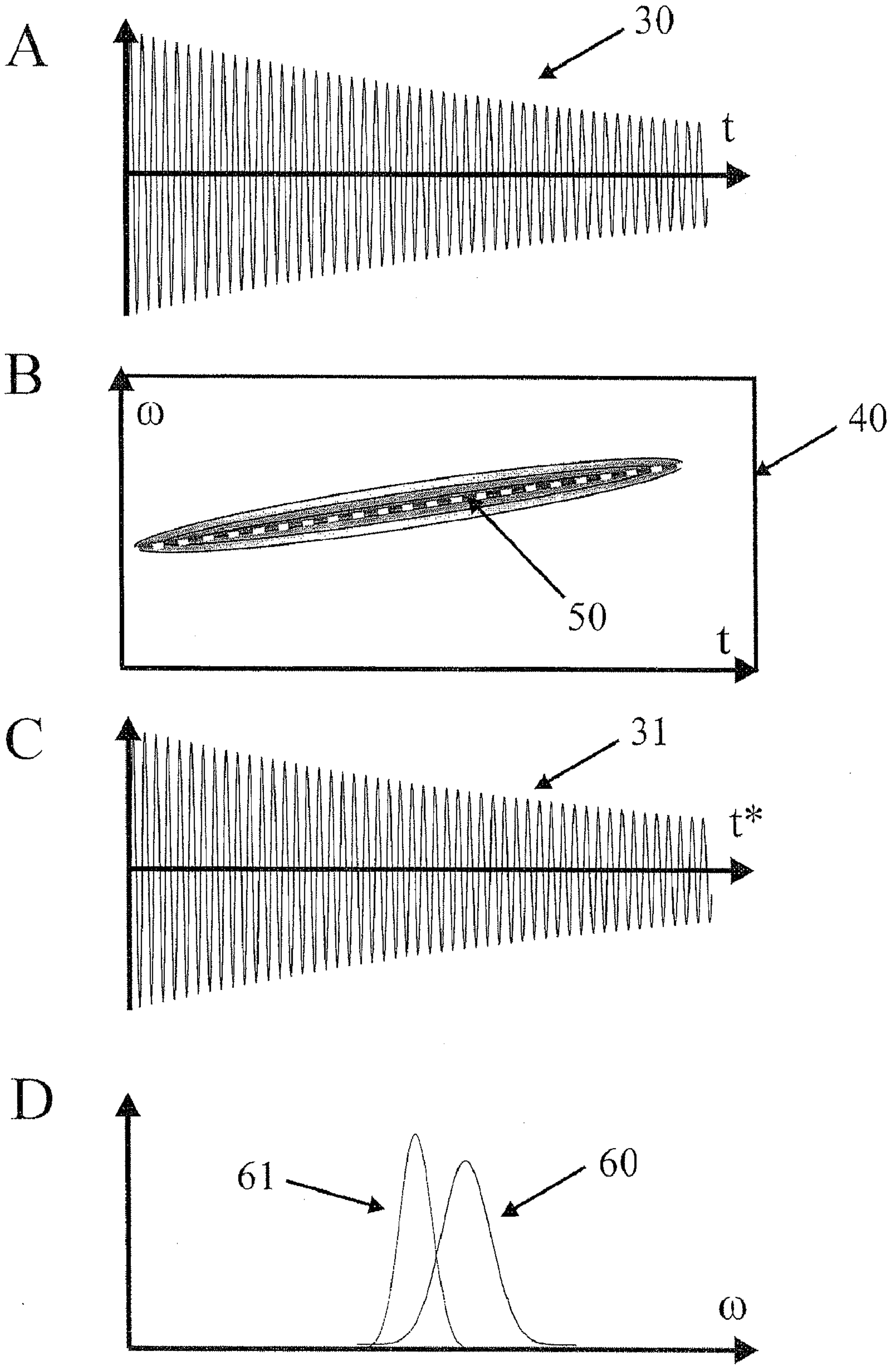
FIGS. 4A to 4D graphically illustrate the method in FIG. 3.

In step 302, a time signal 30 is detected and/or recorded using a frequency mass spectrometer. FIG. 4A graphically illustrates the detected time domain signal 30, which is converted using a Short Time Fourier Transformation method. In step 304, a Short Time Fourier Transform spectrum is generated by shifting a window function that has a smaller temporal expansion than the time signal along the time axis, and multiplying it with the time signal. It should be noted that the window function is not limited to the bell-shaped window function as disclosed in the previous embodiment. The sections of the time signal thus obtained at different points in time are each converted in step 306 by Fourier transformation into a frequency spectrum. It should be noted that often only the amplitude spectrum as a function of the temporal shift of the window function is shown. Like most time-frequency distributions, a Short Time Fourier Transform spectrum is a two-dimensional representation of a time signal having a time axis and a frequency axis. In contrast to "pure" representations as a time signal or frequency spectrum, a time-frequency distribution has both a temporal and a spectral resolution.

FIG. 4B graphically illustrates the Short Time Fourier Transform spectrum 40 of the time domain signal 30 in the form of amplitude spectra. As illustrated, the time domain signal 30 may have, for example, only one frequency component and that the latter's center frequency 50 shifts toward higher frequencies linearly with time. The instantaneous frequency 50 of the frequency component may be quantitatively determined in step 308 from the temporal profile of the maxima of the amplitude spectra or from the first frequency moment of the Short Time Fourier Transform spectrum 40.

In step 310, from the instantaneous frequency 50, a transformation function is derived which transforms the time axis t of the time signal 30 in such a way that the instantaneous frequency of the frequency component in the transformed time signal 31 has a constant profile. The transformed time signal 31 with the new time axis t* is illustrated in FIG. 4C.

FIG. 4D illustrates the amplitude spectra 60 and 61 of a selected frequency peak for both time signals 30 and 31. The correction causes the amplitude spectrum 61 of the transformed time signal 31 to be narrower than the amplitude spectrum 60 of the detected time signal 30. Moreover, the amplitude spectrum 61 is shifted toward lower frequencies than the amplitude spectrum 60 because the correction is aligned toward the instantaneous frequency at the start of the measurement.

Although the present invention has been illustrated and described with respect to several preferred embodiments thereof, various changes, omissions and additions to the form and detail thereof, may be made therein, without departing from the spirit and scope of the invention.

What is claimed is:

1. A method for determining and correcting a frequency mass spectrum from a mass spectrometer, comprising:

(a) recording a time domain signal with a frequency mass spectrometer;

(b) determining the instantaneous frequency of a frequency component as a function of time;

(c) transforming the time axis of the time signal in such that the frequency component of the transformed time signal has an instantaneous frequency with a constant profile in time; and (d) converting the transformed time signal into a frequency mass spectrum.

2. The method of claim 1, wherein the instantaneous frequency of the frequency component is determined from a time-frequency distribution of the time signal.

3. The method of claim 2, wherein the time-frequency distribution is a Short Time Fourier Transform spectrum.

4. The method of claim 2, wherein the time-frequency distribution corresponds to a Cohen's class.

5. The method of claim 2, wherein the instantaneous frequency is determined from a first frequency moment of the time-frequency distribution.

6. The method of claim 1, wherein, in order to determine the instantaneous frequency, the time signal is transformed into a frequency spectrum, a section of the frequency spectrum around the frequency component is inversely transformed into a time domain, and the instantaneous frequency is determined from the temporal phase profile of the inversely transformed section of the frequency spectrum.

7. The method of claim 1, wherein in order to determine the instantaneous frequency, the time signal is multiplied by a bell-shaped window function, the multiplied time signal is transformed into a frequency spectrum by means of a Fourier transform, the phase of the frequency component in the frequency spectrum is approximated by a second degree polynomial, and the linear profile of the instantaneous frequency is determined from a quadratic term of the polynomial.

8. The method of claim 1, wherein the steps (b) to (d) are applied to different frequency components in order to correct different regions of the frequency mass spectrum.

* * * * *